T. J. MAYALL.
Machine for Making Packing, &c.
No. 26,278.
Patented Nov. 29, 1859.
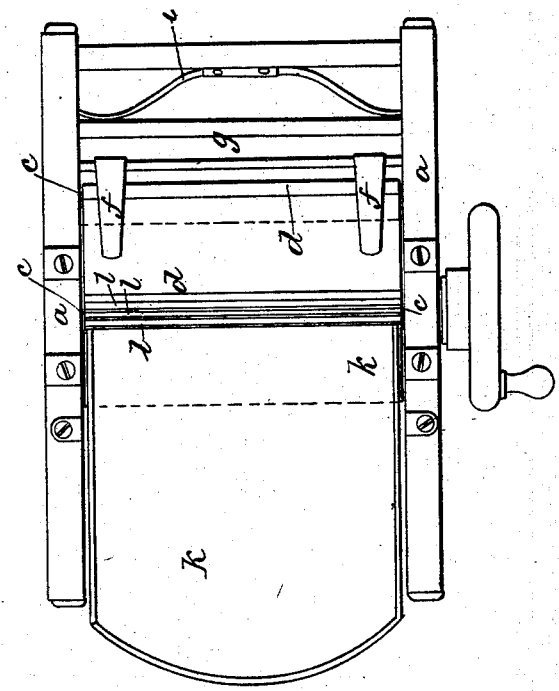
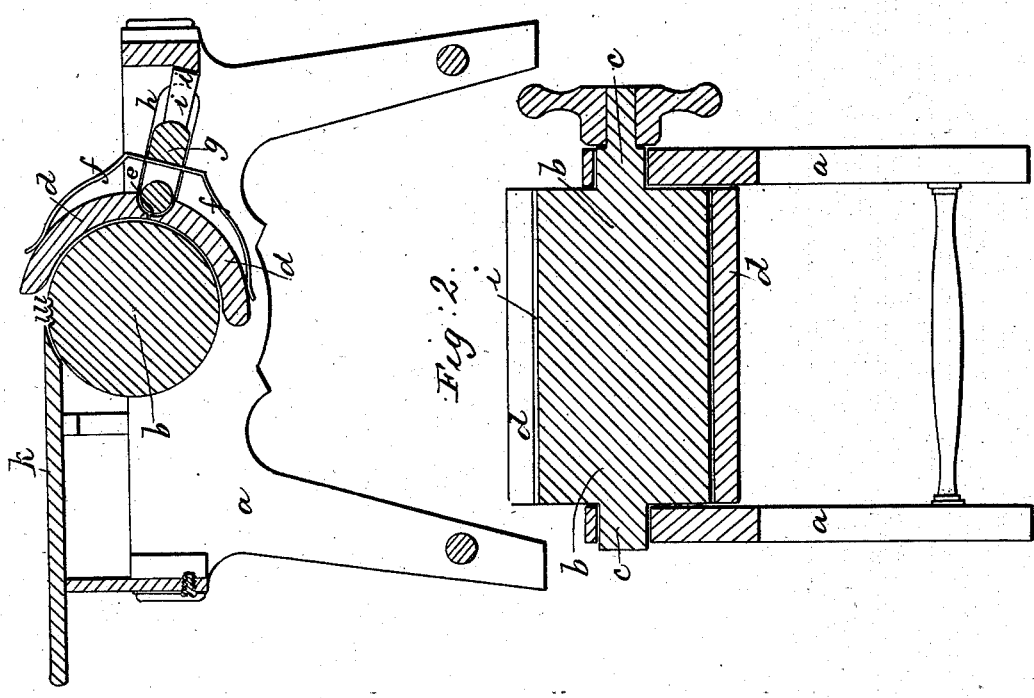
Witnesses:
Joseph Garrett
Albert N. Brown
Inventor:
Thos. J. Mayall

UNITED STATES PATENT OFFICE.

THOMAS J. MAYALL, OF ROXBURY, MASSACHUSETTS.

MANUFACTURE OF PACKING AND TUBING.

Specification of Letters Patent No. 26,278, dated November 29, 1859.

*To all whom it may concern:*

Be it known that I, THOMAS J. MAYALL, of Roxbury, in the county of Norfolk and State of Massachusetts, have invented a new and useful method of making packing, &c., used in steamwork, hose or tubing, and similar articles that are formed by wrapping or winding sheets of elastic fabrics around a core or mandrel; and I hereby declare that the following description, taken in connection with the accompanying drawings, hereinafter referred to, forms a full and exact specification of the same, wherein I have set forth the nature and principles of my said invention by which it may be distinguished from all others of a similar class, together with such parts as I claim and desire to have secured to me by Letters Patent.

The figures of the accompanying plate of drawings represent my improvements.

Figure 1 is a plan or top view of a machine for making packing. Fig. 2 is a transverse, vertical section of the same. Fig. 3 is a central, longitudinal vertical section.

The nature of my invention consists of a new method for forming packing used in valves, steam and other joints, and hose or tubing or in fact any articles that are formed by wrapping or rolling elastic or adhesive fabrics around a central core or upon a mandrel, the essential features of my new method being embodied in a machine in which the fabric used is rolled or wrapped upon a central core or upon a mandrel, between and by the action of two surfaces one of which is made adjustable and by means of springs or otherwise, caused to exert a yielding pressure upon the article to be formed, while the other surface has such a motion given to it upon or against the first named surface as to produce the desired result, viz: that of rolling up the fabric used upon a core or upon a mandrel. In my new machine the core or the mandrel with the fabric to be wrapped around it may be fed between a revolving cylinder or a traveling straight platform and an adjustable yielding shell or table; or the reverse may be the case, viz: between a moving shell or table and an adjustable yielding cylinder or an adjustable yielding table,—it being necessary in either case that one of the surfaces between which the article to be formed is rolled, should yield by springs or otherwise, sufficiently to allow the same to gradually increase in diameter or in the number of its fold or wrappings.

Having thus premised the general features of my new method of forming packing, hose, &c., I will now proceed to describe in detail the construction and operation of a machine by which the desired results can be accomplished.

$a\ a$ in the drawings represent the supporting framework of the machine.

$b\ b$ is a cylinder having its bearings at $c\ c$ and made to revolve in any proper manner.

$d\ d$ is a shell which turns upon centers $e\ e$ and is pressed upon by springs $f\ f$ attached to a bar $g\ g$ moving in slots or grooved bearings $h\ h$ and acted upon by a bent spring $i$, so that the shell is made to exert a yielding pressure upon the cylinder $b\ b$. When packing is to be made a sheet of any suitable fabric coated with rubber or gutta percha or with a proper cement is placed upon a platform $k\ k$. A small cylinder or core of rubber or gutta percha is then placed in shallow grooves $l\ l$ formed in the cylinder $b\ b$, and the fabric to be rolled around the same attached thereto. The cylinder is then revolved and carries the core between the revolving cylinder $b\ b$ and the yielding shell $d\ d$, thereby revolving the core of rubber or gutta-percha and rolling or wrapping the fabric around it. This operation is continued until a sufficient number of the folds of the fabric have been wound around the core, the shell $d\ d$ yielding sufficiently to adapt itself to the gradually increasing diameter of the packing and yet constantly exerting the requisite pressure upon the same. Hose or tubing can be formed in a precisely similar manner it being only necessary to substitute a mandrel for the core of rubber or gutta percha.

It will be evident that in lieu of a revolving cylinder and an adjustable yielding shell, a stationary cylinder and a revolving shell may be used and that instead of using two curved surfaces like the cylinder and its pressure shell, two flat surfaces may answer the purposes contemplated, it being only necessary in every case that one of the surfaces should exert a self adjusting yielding pressure upon the packing or other article to be formed while the other surface has the necessary motion imparted to it to roll or wind the fabric used around the core or mandrel.

Having thus described my improvements, I shall state my claim as follows:

What I claim as my invention and desire to secure by Letters Patent is—

My new method of forming packing, hose or tubing and other similar articles, the same consisting in rolling or wrapping the fabric to be used around the core or mandrel by rolling or passing the said core or mandrel and the fabric or wrapper together between two surfaces, one of which exerts a self-adjusting yielding pressure upon the article to be formed, while the other surface has the necessary motion imparted to it to roll or wind the fabric used around the core or mandrel, substantially as set forth.

THOS. J. MAYALL.

Witnesses:
 JOSEPH GAVETT,
 A. W. BROWN.